United States Patent [19]

Blauch et al.

[11] Patent Number: 5,173,138
[45] Date of Patent: Dec. 22, 1992

[54] METHOD AND APPARATUS FOR THE CONTINUOUS PRODUCTION OF CROSS-PLIED MATERIAL

[76] Inventors: Denise A. Blauch, 934 Lime Spring Way, Louisville, Ky. 40223; Steven A. Young, 2821 Wicklow La., Richmond, Va. 23236; Rex B. Gosnell, 3114 Via DeCaballo, San Diego, Calif. 92024; Virgil W. Jainicke, 4408 Mayapan Dr., La Mesa, Calif. 92024; Lawrence E. Swarts, 14520 Biddeford St., Poway, Calif. 92064

[21] Appl. No.: 564,214
[22] Filed: Aug. 8, 1990
[51] Int. Cl.⁵ .............................. B32B 31/18
[52] U.S. Cl. .................... 156/177; 156/178; 156/249; 156/260; 156/265; 156/266; 156/285; 156/519; 156/552; 156/583.1
[58] Field of Search ............... 156/177, 178, 260, 265, 156/266, 519, 552, 285, 249, 580, 583.1

[56] References Cited

U.S. PATENT DOCUMENTS

| | | | |
|---|---|---|---|
| 1,611,462 | 12/1926 | Lambert | 156/552 |
| 3,236,711 | 2/1966 | Adler | 156/177 |
| 3,345,230 | 10/1967 | McClean | 156/519 |
| 3,616,037 | 10/1971 | Burger | 156/177 |
| 3,682,734 | 8/1972 | Burger | 156/178 |
| 3,992,240 | 11/1976 | Kuehn, Jr. | 156/250 |
| 4,256,522 | 3/1981 | Britton | 156/265 |
| 4,403,012 | 9/1983 | Harpell et al. | 428/290 |
| 4,457,985 | 7/1984 | Harpell et al. | 428/224 |
| 4,623,574 | 11/1986 | Harpell et al. | 428/113 |
| 4,933,039 | 6/1990 | Vittone et al. | 156/177 |
| 4,992,124 | 2/1991 | Kurihara et al. | 156/265 |

Primary Examiner—Caleb Weston

[57] ABSTRACT

The present invention provides a method and apparatus for the automated production of a cross-plied material, preferably for structural or anti-ballistics end use. The apparatus comprises means for advancing a first, continuous ply of material into a cross-plying zone; means for sequentially laying a plurality of discontinuous second plies of material coplanarly on the first ply in the cross-plying zone with the longitudinal axis of each of the second plies rotated relative to the longitudinal axis of the first ply; means for preconsolidating the first and the second plies; and means for withdrawing the cross-piled material from the cross-plying zone. The method features the steps of advancing the first ply of material into a cross-plying zone; sequentially laying the second plies of material coplanarly on the first ply in the cross-plying zone with the longitudinal axis of each of the second plies rotated relative to the longitudinal axis of the first ply; preconsolidating the first and the second plies; and withdrawing the cross-piled material from the cross-plying zone. The cross-piled material produced can be rolled up in a bolt, which also forms part of this invention, for subsequent processing or use.

45 Claims, 5 Drawing Sheets

METHOD AND APPARATUS FOR THE CONTINUOUS PRODUCTION OF CROSS-PLIED MATERIAL

BACKGROUND OF THE INVENTION

1. Field of the Invention

The present invention relates to method and apparatus for the continuous, automatic production of cross-plied material, preferably for structural or anti-ballistic end uses and preferably for supply in roll form, i.e., like a bolt of cloth, for subsequent processing or use. The present invention also relates to a cross-plied material, especially in rolls, made in accordance with the method and which can be ballistic resistant.

A "ply" is one layer of material, and a "cross-ply" or "cross-plied material" is a plurality of layers of material, preferably only two, which are superimposed with the axes of adjacent layers rotated relative to one another.

2. Prior Art

SPECTRA SHIELD TM ballistic resistant armor material, commercially available from Allied Signal Corporation, comprises two layers of unidirectional SPECTRA ® polyethylene fibers in a flexible thermoplastic resin in a 0°,90° fiber orientation. SPECTRA SHIELD material can be incorporated into lightweight body armor or rigid composite armor, with the threat level determining the number of layers of material used. The material is typically delivered to the customer in rectangular, preferably square, sheets which can then be cut and fabricated into a desired configuration. There would be less waste of material, and thus less expense to the customer, if the composite material could be furnished in continuous roll form, i.e., like a bolt of cloth, rather than in squares or rectangles. This would permit the customer to maximize material usage by continuously repeating the pattern to be cut from the continuous length of material and thereby eliminate the scrap formed by using rectangular sheets.

Ballistic resistant articles and fibers conventionally used in them are well known, as taught by, e.g., U.S. Pat. No. 4,403,012, 4,457,985 and 4,916,000, all of which are hereby incorporated by reference.

U.S. Pat. No. 4,623,574, hereby incorporated by reference, discloses the formation of prepreg sheets comprised of elastomer coated high strength fibers which are substantially parallel and aligned along a common fiber direction. The patent teaches that the prepreg sheets can be plied together, with successive sheets being rotated relative to the first sheet, to form simple composite materials. These composite materials are of a given size, e.g., 12×12 inches (4.7×4.7 cm), and are individually molded prior to being sent to the customer. This patent is exemplary of the prior art represented by the SPECTRA SHIELD material discussed above.

U.S. Pat. No. 3,992,240, hereby incorporated by reference, teaches method and apparatus for mass production of an elongated multiple ply laminated structure of variable cross section. The plies are resin impregnated fiber plies which are brought into longitudinal alignment, combined and laminated.

The present invention, which was developed in an attempt to overcome the deficiencies of the prior art, provides a cross-plied material by a continuous, automated method.

SUMMARY OF THE INVENTION

The present invention provides a method and apparatus for the continuous, automated cross-plying of material, preferably for anti-ballistic end use or in impact resistant structural components, e.g., radomes, sonar domes, helmets.

In one embodiment, the apparatus is for the automated cross-plying of a first, continuous ply of material and a plurality of second, discontinuous plies of material into a cross-plied continuous length of material, each of the first and the second plies of material having a longitudinal axis. The apparatus comprises: a) means for advancing the first ply of material into a cross-plying zone; b) means for sequentially laying the second plies of material coplanarly on the first ply in the cross-plying zone with the longitudinal axis of each of the second plies rotated relative to the longitudinal axis of the first ply; c) means for preconsolidating the first and the second plies; and d) means for withdrawing the cross-plied material from the cross-plying zone.

It is preferred that each second ply be laid so that it substantially abuts the next adjacent second ply on the first ply. This is especially important when the cross-plied material will be used in a ballistic resistant article. "Substantially abuts" is meant to encompass not only fully butted edges but also slightly overlapped edges of the second, discontinuous plies.

It is also preferred that each of the second plies have a length substantially equal to the width of the first ply, and each of the second plies is laid with its non-abutting outer edges substantially in register with the continuous edges of the first ply.

The means for advancing the first ply of material into the cross-plying zone preferably comprises, in combination: a first carrier web on which the first ply is carried; first supply means for supplying the first ply of material on the first carrier web; and first pull means to pull the first carrier web from the first supply means under tension into the cross-plying zone. The preferred first supply means comprises a roll on which the first ply of material and the first carrier web are wound together, and the preferred first pull means comprises a pair of driven pinch rolls downstream of the cross-plying zone. Alternatively, the first supply means comprises a driven feed roll on which the first ply of material and the first carrier web have been wound together, and the first pull means comprises a driven roll downstream of the cross-plying zone. The preferred means for withdrawing the cross-plied material from the cross-plying zone is a take-up roll.

The means for sequentially laying the second plies of material preferably comprises, in combination: a second carrier web on which the discontinuous plies are separately carried; second pull means to pull the second carrier web with the discontinuous plies thereon so that each discontinuous ply and the first ply face each other in the cross-plying zone; and means for guiding each discontinuous ply and the first ply into contact with one another. It is preferred that the discontinuous plies releasably adhere to the second carrier web. The preferred second pull means is a pair of driven pinch rolls. The preferred means for guiding each discontinuous ply and the first ply into contact with one another comprises a press roll. Preferably, the means for sequentially laying the second plies is responsive to the advance into the cross-plying zone of a predetermined length of the first ply of material, and the means for withdrawing and the means for advancing are each responsive to the laying and preconsolidation of a second ply on the first ply.

In another embodiment, the apparatus is for the automated production of a cross-plied material from a first, continuous ply of material and a second, continuous ply of material, the first and second plies of material each comprising a network of fibers substantially coated with a resin matrix, the first and second plies exhibiting substantial interply adherence when brought into contact with one another, each of the first and the second plies of material having a longitudinal axis. The apparatus comprises: a) means for advancing the first ply of material into a cross-plying zone; b) cutting means for cutting the second ply in a direction transverse to its longitudinal axis a sufficient number of times to form a plurality of discontinuous pieces of the second ply; c) means for sequentially laying the discontinuous pieces of the second ply coplanarly on the first ply in the cross-plying zone with the longitudinal axis of each of the pieces rotated relative to the longitudinal axis of the first ply; d) means for preconsolidating the discontinuous pieces and the first ply; and e) means for withdrawing the cross-plied material from the cross-plying zone.

The apparatus of this second embodiment is similar to that of the first except that it includes a cutting mechanism for cutting the second ply to form the plurality of discontinuous pieces of the second ply. Therefore, the above discussion of preferred apparatus for the first embodiment is equally applicable here. In each of the embodiments, when the second ply (discontinuous piece) releasably adheres to the second carrier web, it is preferred that the apparatus further comprises means for releasing the cross-plied material from the second carrier web.

The apparatus of both the first and second embodiments may optionally comprise a second cutting means for cutting the first ply in a direction transverse to its longitudinal axis a sufficient number of times to form a plurality of discontinuous pieces of the first ply. In this instance, the means for sequentially laying the discontinuous pieces of the second ply on the first ply sequentially lays one of the pieces in register with one of the discontinuous pieces of the first ply.

In yet a third embodiment, apparatus is provided for the automated production of cross-plied material from a first, continuous ply of material and a second, continuous ply of material, each of the plies of material comprising a network of unidirectional fibers substantially coated with a resin matrix. Each of the plies of material also has a longitudinal axis substantially in the direction of the unidirectional fibers, and both plies exhibit substantial interply adherence when brought into contact with one another. The apparatus comprises, in combination, the following elements, many of which have been described above: a) a first carrier web; b) first supply means; c) first pull means; d) a second carrier web; e) second supply means; f) a cutter; g) second pull means; h) means for guiding the discontinuous piece and the first ply into contact with one another; i) means for preconsolidating; j) means for releasing the cross-plied material from the second carrier web; and k) withdrawing means. With this apparatus, the second pull means pulls the second carrier web with the discontinuous piece thereon so that the length of the discontinuous piece and the width of the first ply face each other and are in substantial register with one another in the cross-plying zone. The second pull means pulls the second carrier web from the cross-plying zone after the discontinuous piece and the first ply are cross-plied.

The method of the present invention is for the automated production of a cross-plied continuous length of material from a first, continuous ply of material and a plurality of second, discontinuous plies of material. Each of the first and the second plies of material has a longitudinal axis. The method comprises the steps of: a) advancing said first ply of material into a cross-plying zone; b) sequentially laying said second plies of material coplanarly on said first ply in the cross-plying zone with the longitudinal axis of each of said second plies rotated relative to the longitudinal axis of said first ply; c) preconsolidating said first and said second plies; and d) withdrawing the cross-plied material from the cross-plying zone. Again, each of the second plies preferably substantially abuts the next adjacent second ply on the first ply. Also, each of the second plies has a length substantially equal to the width of the first ply and each of the second plies is laid with its non-abutting outer edges substantially in register with the continuous edges of the first ply. It is preferred that the first and second plies exhibit substantial interply adherence when brought into contact with one another; that each of the first and second plies comprises a network of fibers, preferably unidirectional in orientation, substantially coated with a resin matrix. The method preferably further comprises the step of rolling up the cross-plied material withdrawn from the cross-plying zone.

The present invention is also a roll of cross-plied material produced according to the method.

DETAILED DESCRIPTION OF THE INVENTION

The present invention will be understood by those skilled in the art by reference to the accompanying figures wherein like numbers refer to like apparatus. The present invention is a method and apparatus for the continuous, automatic production of a cross-plied material 30.

Figure 1:
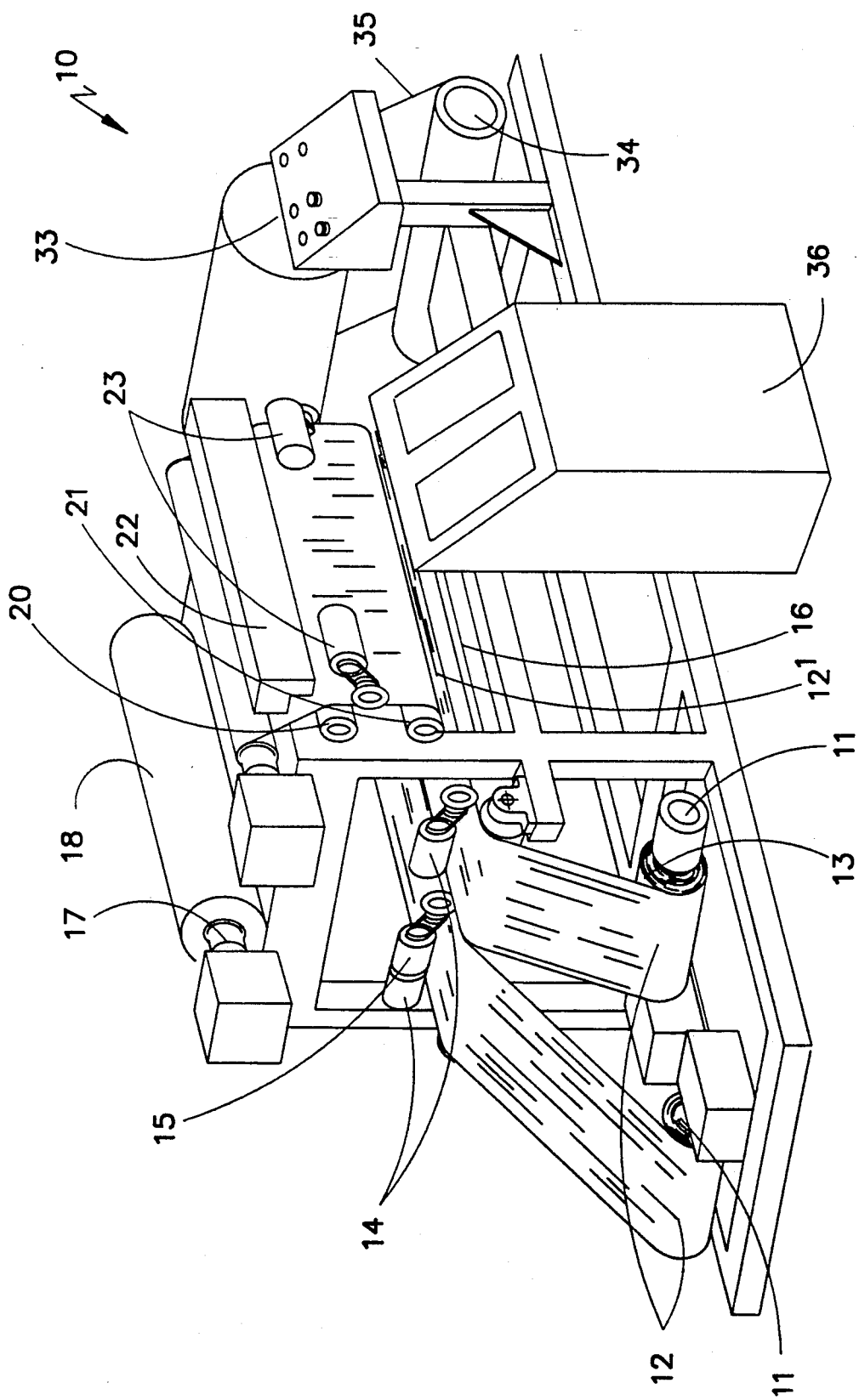
FIG. 1 is a perspective view from the let off roll 11 end of apparatus of the present invention.
Figure 2:
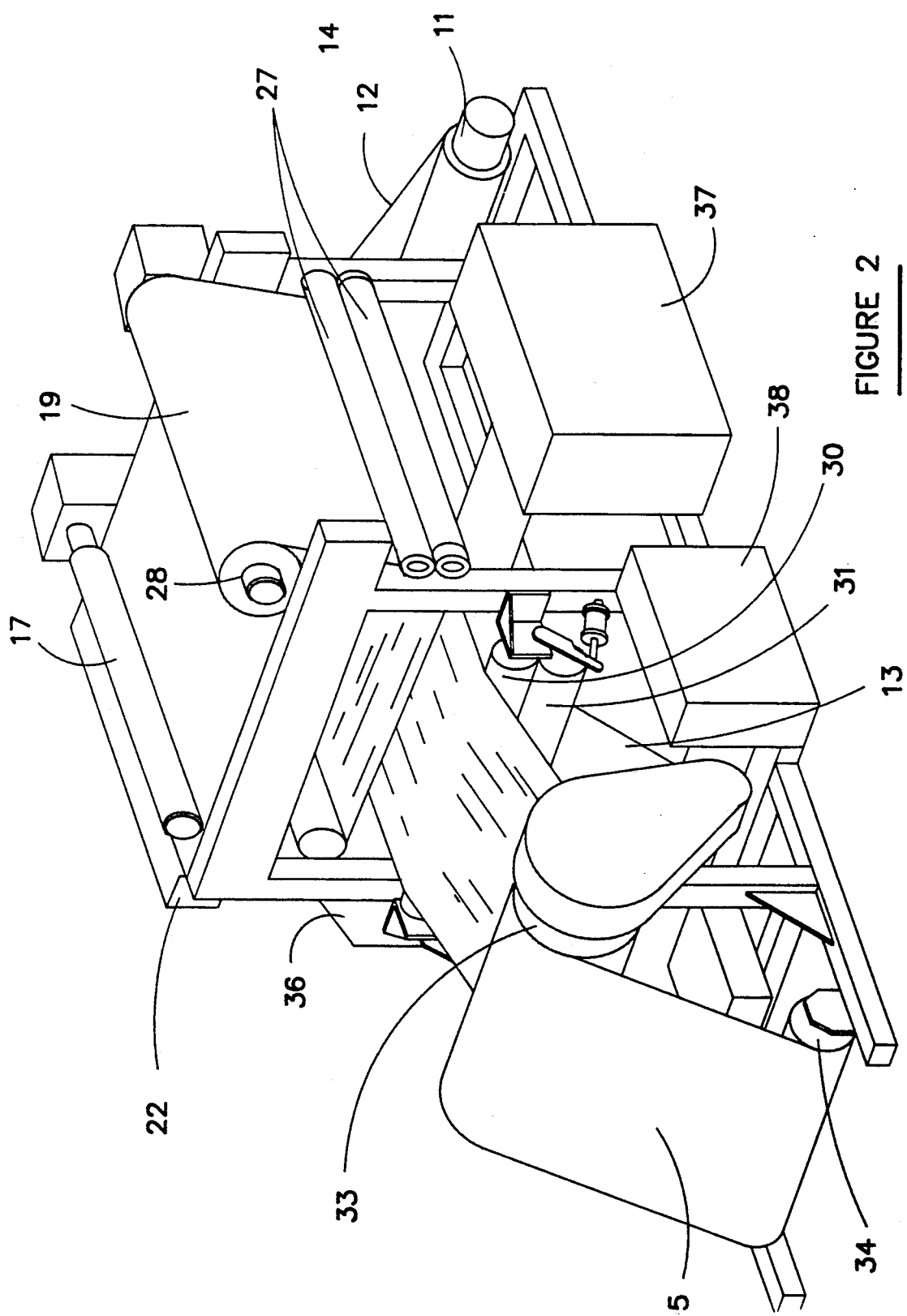
FIG. 2 is a perspective view from the cross-plied material 30 take-up end of apparatus of the present invention.
Figure 3:
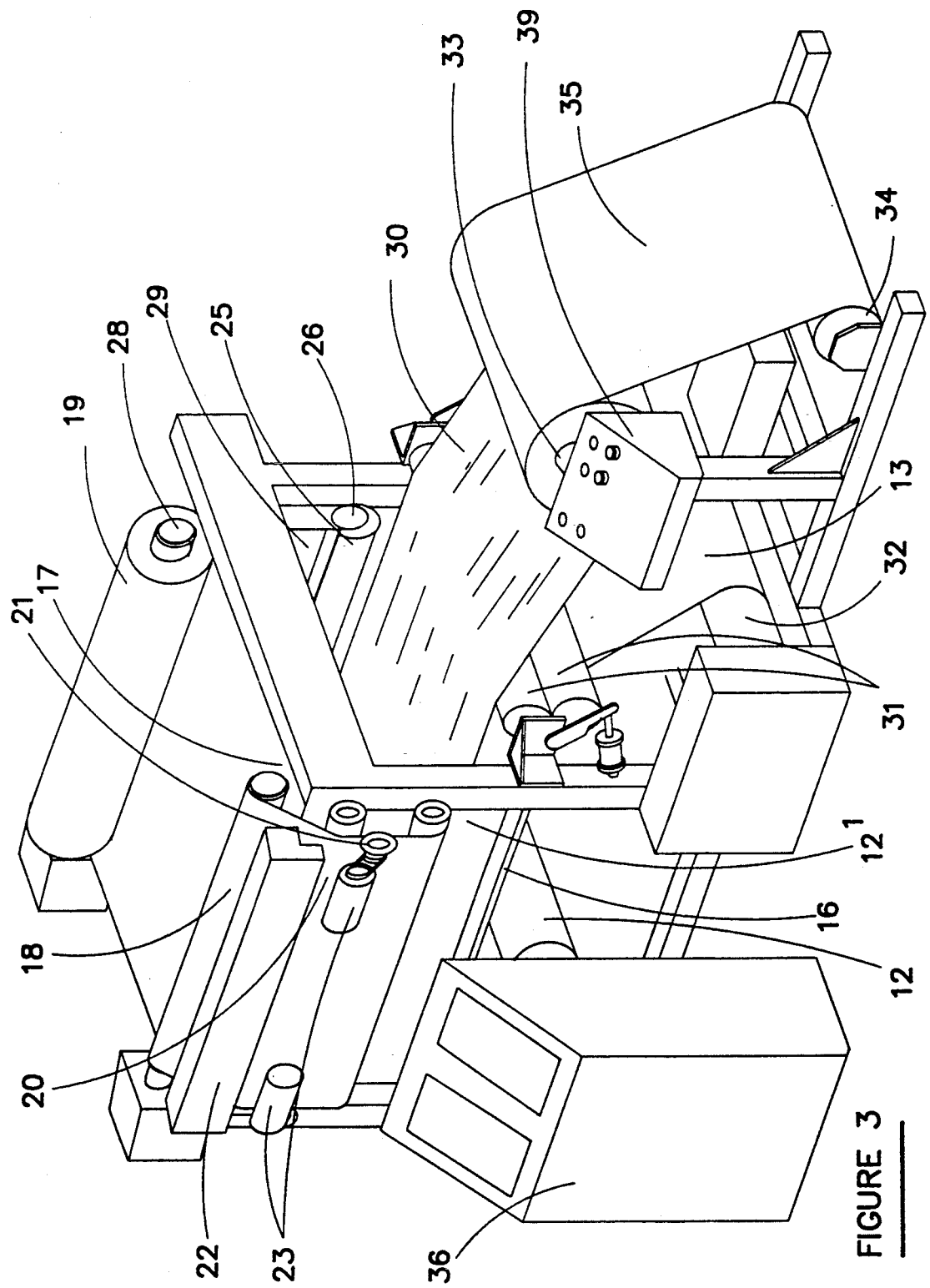
FIG. 3 is another perspective view of the FIG. 2 apparatus but from the other side of the take-up 33 apparatus.

With reference generally to FIGS. 1, 2 and 3, plies 12 are advanced from let off rolls 11 (0° direction) on carrier webs 13 through slitters 14 and 15 into the cross-ply section of machine 10. In the most preferred embodiment, the plies 12 comprise unidirectional fibers in a resin system, as will be detailed later, and carrier webs 13 are release paper. Let off rolls 11 are freewheeling rolls with brakes (not shown). Plies 12 are advanced coplanarly and slightly overlap at their inner edge. Slitters 14 are rotating blade slitters which trim the outside edges of plies 12 to assure uniform width of the continuous ply to be formed. Slitter 15 trims the overlapping inside edges of plies 12, which brings the newly cut adjacent edges of the two plies 12 together to form a single, wider, continuous ply 12'. The trimmed material is taken off to waste (not shown). Continuous ply 12' advances on carrier webs 13 across transfer platen 16 where it is cross-plied with ply 18 (see FIGS. 2, 4A and 4B for greater detail). The cross-plied material 30 is separated from carrier webs 13 by a button guide (not shown) as they leave platen 16. The button guide is a static shaft with a slot for webs 13 and a smooth flat head. The inside edges of webs 13 must run inside this slot. The button guide is located on the exit side of platen 16 and is on a centerline with the center lower slitter 15. The cross-plied material 30 and carrier webs 13 then pass over the top roll of pinch rolls 31. Carrier webs 13 are fed back between pinch rolls 31 and then under the bottom roll of pinch rolls 31 to take-up rolls 32. Pinch rolls 31 are driven by a stepper motor (not shown), which is programmed to turn pinch rolls 31 a predetermined number of revolutions and then stop. There are two adjacent take-up rolls 32 (one for each of carrier webs 13) which are driven with a slip clutch (not shown). When the stepper motor stops, pinch rolls 31 do not turn, the clutch for take-up rolls 32 slips, and thus, take-up rolls 32 do not turn. Speed of take-up rolls 32 is set based on the speed of pinch rolls 31, to maintain the carrier web 13 taut therebetween. Material 30 is taken up at take-up roll 33 with interleaf 35 supplied from let off roll 34 over the top of take-up roll 33. A small drag brake (not shown) prevents overfeeding of the roll. Interleaf 35 functions as a release boundary layer to the cross-plied material 30. The preferred interleaf is a film, most preferably a polyethylene film. Speed of take-up is set based on the speed of pinch rolls 31, to maintain the cross-plied material 30 taut therebetween. Let off roll 34 is a freewheeling roll with brakes (not shown).

Transfer platen 16 has perforations (not shown) in its top surface. These perforations open onto channels through which a vacuum can be pulled by a solenoid valve turning air onto air operated vacuum pumps (not shown). When vacuum is applied, carrier webs 13 with ply 12' thereon are pulled down against transfer platen 16 to be held in place for the heating of ply 12'. Other channels (not shown) are machined into transfer platen 16 and receive a heated medium, such as oil, from a hot oil heater (not shown) to heat transfer platen 16.

Figure 4A:
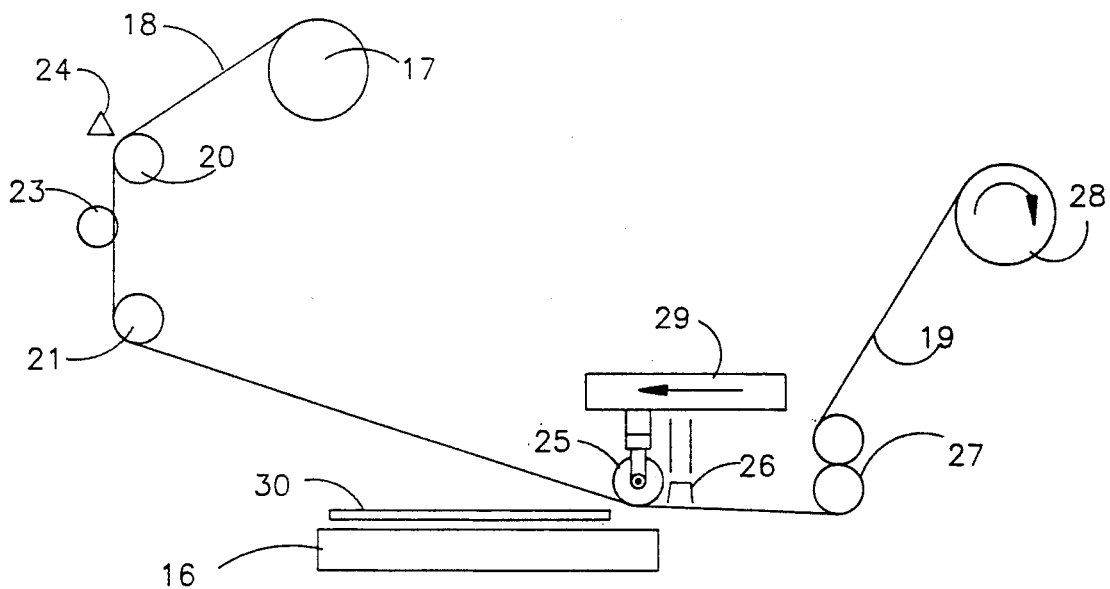
FIG. 4A is a partial schematic, from the cross-plied material 30 take-up end, of the cross-ply section of machine 10 with sled assembly 29 in the inoperative (home) position.
Figure 4B:
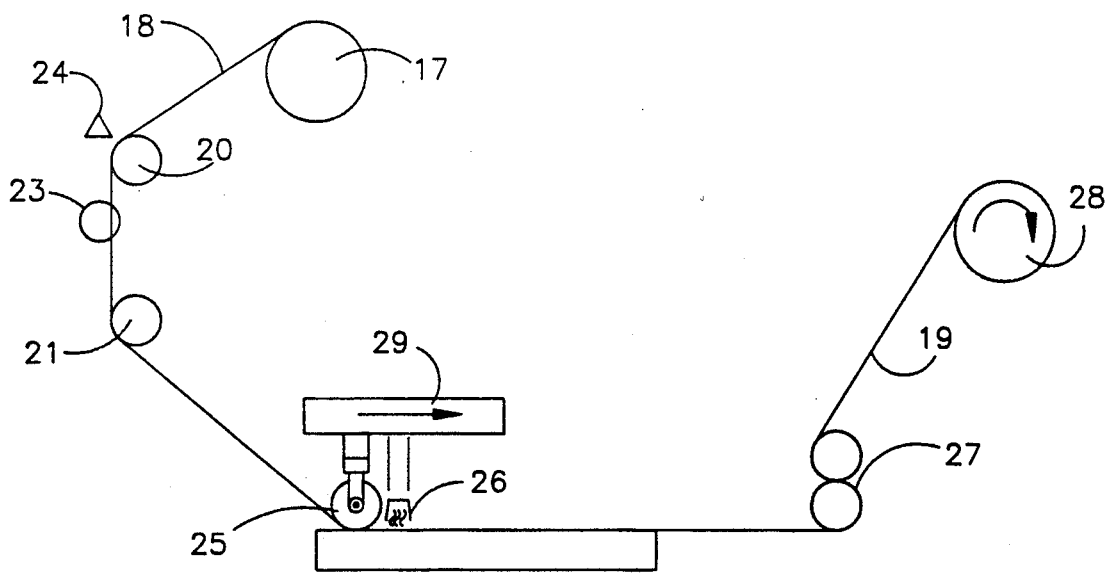
FIG. 4B is a schematic similar to FIG. 4B but with sled assembly 29 in the operative position.
Figure 5:
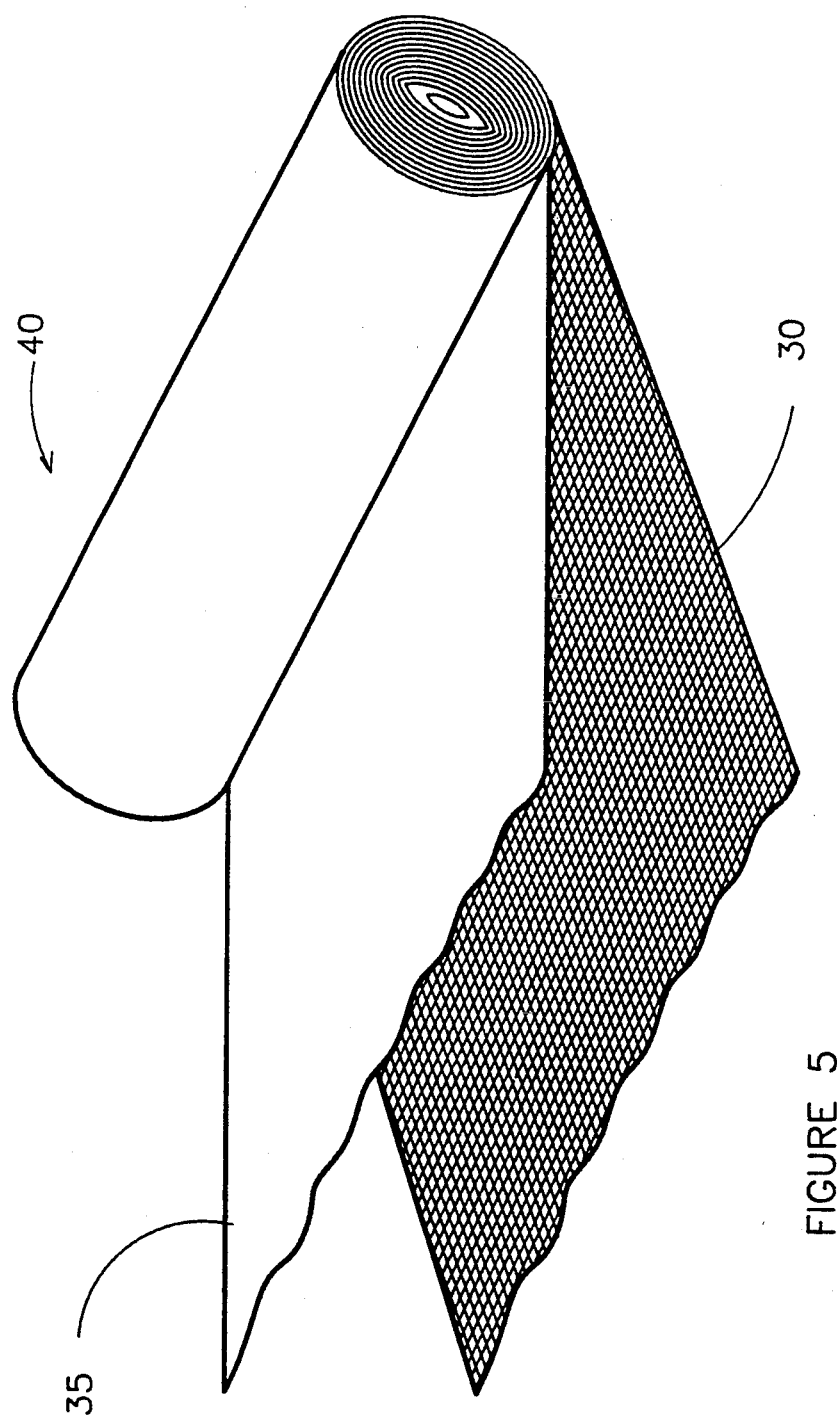
FIG. 5 is a perspective view of a bolt 40 of cross-plied material 30 of the present invention.

With particular reference to FIGS. 3, 4A and 4B, let off roll 17 (90° direction) advances ply 18 on carrier web 19 over idler rolls 20 and 21 into the cross-ply section of machine 10. Carrier web 19 actually contacts rolls 20 and 21, while ply 18 is carried on carrier web 19. In the most preferred embodiment, ply 18 comprises unidirectional fibers in a resin system, as will be detailed later, and carrier web 19 is release paper. The cutting mechanism for cutting ply 18 is housed by enclosure 22 (FIG. 3), which is connected to the frame of machine 10. In the preferred embodiment, the cutting mechanism is an electrical resistance heated blade 24 (FIGS. 4A, 4B). Blade 24, which is mounted on a guided carriage (not shown), traverses across the width of ply 18 at idler roll 20 to cut ply 18 without damage to carrier web 19. A limit switch (not shown) at each travel end stops the carriage while a cam block (not shown) lifts the blade 24 from ply 18. The second cut of ply 18 occurs after a predetermined length of ply 18 (one width of ply 12') has advanced to be cross-plied with ply 12'. Between idler rolls 20 and 21, the outer edges of ply 18 and carrier web 19 are cut by slitters 23, which are rotating blade slitters, to assure uniform ply 18 width and to assure that the reinforcing fiber in ply 18 is brought to the very edge of ply 18. After idler roll 21, carrier web 19 passes under transfer roll 25 and associated heater 26. Transfer roll 25 and associated heater 26 are connected to transfer sled 29 which traverses back and forth between an inoperative, home position and an operative, extended position. Sled 29 is driven by a DC motor and screw arrangement (not shown). A proximity switch (also not shown) at each travel end stops the travel of sled 29. Carrier web 19 then passes under and back through a set of pinch rolls 27 to be taken up on take-up roll 28 (FIG. 2), which is driven with a slip clutch (not shown). Cut ply 18 is carried on the underside of carrier web 19 after idler roll 21 and is cross-plied with ply 12' above transfer platen 16. Pinch rolls 27 are also driven by a stepper motor (not shown), which is programmed to turn pinch rolls 27 a predetermined number of revolutions and then stop. When the stepper motor stops, pinch rolls 27 do not turn, the clutch for take-up roll 28 slips, and thus, take-up roll 28 does not turn. Speed of take-up roll 28 is set based on the speed of pinch rolls 27, to maintain the carrier web 19 taut therebetween. Let off roll 17, driven through a slip clutch, is a contra-rotating roll which is always trying to take up or rewind ply 18 on carrier web 19. Speed of roll 17 is set to maintain tension on carrier web 19 during the movement of transfer sled 29 from the operative to the inoperative positions.

Control console 36 (FIGS. 1 and 3) houses the electrical controls for the following: slitters 14, 15 and 23; let off roll 17; blade 24; sled 29, including transfer roll 25; vacuum pump; heater 26; pinch rolls 27 and 31; indicator lamps (not shown); and take-up rolls 28 and 32.

Control cabinet 37 (FIG. 2) houses all of the pneumatic/vacuum controls for the following: clutches for let off rolls 11 and 17; transfer roll 25 pressure; pinch rolls 27 and 31 pressure; clutches for take-up rolls 28 and 32; and solenoid for applying air to the vacuum pumps.

Enclosure 39 (FIG. 3) houses the electrical/pneumatic controls for cross-plied material 30 take-up roll 33.

The apparatus is "strung up" in the 0° direction by manually advancing plies 12 from let off rolls 11 on carrier webs 13 to take-up rolls 33 and 32, respectively, and in the 90° direction by manually advancing ply 18 from let off roll 17 on carrier web 19 which is then taken up at roll 28, all as more thoroughly detailed above.

To start the machine sequence all pressure adjustments and control switches on control console 36 and control cabinet 37 are set, and sled 29 is put in the home position (FIG. 4A). An Auto/Manual selector switch is placed in the Auto position to prepare a programmable logic controller program for the sequence. The program controls and sequences the individual devices of the machine. The cycle is started by pressing a cycle start pushbutton.

In the first sequence, a conventional motor, gear and chain arrangement (not shown) drives blade 24, which is electrically heated, transverse to the advance of ply 18, and ply 18 is cut by heated blade 24.

In the second sequence, slitters 23 are started and ply 18 on carrier web 19 is advanced a distance equal to the width of ply 12'. Slitters 23 stop at the end of this sequence.

In the third sequence, ply 18 is again cut by blade 24.

In the fourth sequence, slitters 23 are started, sled 29 traverses the width of transfer platen 16, heater 26 goes to high, and cut ply 18 on carrier web 19 is advanced across, without contacting, ply 12'. The cut made in the third sequence will stop on the near edge of ply 12'. Slitters 23 stop at the end of this sequence.

In the fifth sequence, vacuum is applied to transfer platen 16, transfer roll 25 drops down to force ply 12' and cut ply 18 into contact with one another, and sled assembly 29 returns across platen 16 to its home position (FIGURE 4A). Heat from oil heated platen 16 passes through carrier webs 13 to cause the resin in ply 12' to become tacky, without adversely affecting carrier webs 13. Heater 26, mounted on sled 29, heats carrier web 19 and indirectly, ply 18. This heat causes the resin in ply 18 to become tacky, and when carrier web 19 is formed of release paper as is preferred, reduces the ability of carrier web 19 to carry ply 18. Transfer roll 25 applies pressure to carrier web 19 and thus to both plies 18 and 12', which are both tacky, to cause them to adhere to one another sufficiently to prevent their being pulled apart (preconsolidation). This produces cross-plied material 30. When transfer sled 29 gets to the home position, transfer roll 25 will raise, the heater 26 will go to low heat, and slitters 14, 15, and 23 will start.

In the sixth sequence, the stepper controller for pinch rolls 31 advances ply 12' across transfer platen 16 a distance equal to one width of ply 18 while signaling the take-up stand tension to go to a high tension setting during this move. The program (PLC) signals the stepper controller for pinch rolls 27 to advance carrier web 19, and thus ply 18, a distance such that the previous cross cut, which was at the near edge of ply 12', is now the width of ply 12' from the heated blade 24. Slitters 14, 15, and 23 stop, and the take-up stand tension returns to idle.

The next sequence is that of sequence three above, and so on. The operator can press the cycle start pushbutton to end the cycle and the sequence will stop before this step commences.

Other acceptable cutting mechanisms are, e.g., lasers, hot wires, water jets, ultrasonic vibrating edges, etc., as would be obvious to one of ordinary skill in the art. The cutting mechanism and sequence can be eliminated altogether by using precut, discontinuous ply lengths which preferably releasably adhere to the carrier web. The lengths could be cut to the width of ply 12' and advanced into the cross-ply zone with minor modifications to the apparatus and timed sequence.

Heater 26 can be an infrared, radiant or convection heater. Heat can alternately be supplied by heating transfer roll 25 or another pressure roll/platen with, e.g., electricity, steam, hot air, hot oil. Similarly, transfer platen 16 could be heated with electricity, steam, or hot air. The temperatures chosen will depend on the material forming the particular plies. The example sets forth ranges for the most preferred embodiment.

Suitable other means for advancing the plies into the cross-ply zone of the apparatus could be a stepper motor with feed rolls (in lieu of let off rolls) for an incremental feed to the cross-ply zone; tension could be maintained between the feed rolls and driven take-up rolls via a speed differential on the rolls. Also, a stepper motor could be used directly with a driven take-up roll to advance a ply. Basically, any type of roll or other feeding device with a feedback mechanism for advancing material a fixed distance could be used in the present invention.

It should be readily apparent that a single, wider ply could be formed to obviate the need for forming ply 12' of two plies 12. The button guide for separation of product 30 from webs 13 would no longer be needed, nor would the center slitter 15. Take-up equipment for webs 13 would be replaced by a single take-up system for the single carrier web used.

The apparatus described could readily be modified to construct cross-plied material of more than two layers. For example, if one views ply 12' (0° direction) as the carrier ply/layer, then apparatus similar to that for advancing and cross-plying ply 18 with ply 12' could be inserted downstream of the cross-ply zone for material 30 and prior to material 30 take-up roll 33 for the cross-plying of additional plies/layers. Furthermore, apparatus similar to that for advancing ply 12', i.e., without cutting the ply, could be inserted downstream of the cross-ply zone for material 30 and prior to material 30 take-up roll 33. The added operations would be tied into the timed sequence of the basic cross-ply apparatus. Other similar modifications would be readily apparent to one of ordinary skill in the art and are intended to be covered by the present invention.

By layer is meant a shaped article such as a film, tape, or a network of fiber or tape, bi-axially oriented or otherwise, most preferably a network of fibers. The layer has to have sufficient integrity to be cross-plied using the method and apparatus of the present invention. In the case of fibrous networks, a fiber bonding media may be necessary to produce the desired integrity. The fiber bonding media may be, by way of example, a resin matrix, an adhesive, the fabric construction (e.g., woven, crimped, needlepunched), thread used in stitching a fabric, etc.

By fiber is meant an elongate body, the length dimension of which is much greater than the transverse dimensions of width and thickness. Accordingly, the term fiber includes monofilament, multi-filament, ribbon, strip, staple and other forms of chopped, cut, or discontinuous fiber and the like having regular or irregular cross-sections. The term fiber includes a plurality of any one or combination of the above. Fiber and filament are used interchangeably hereafter.

By network is meant tapes or fibers arranged in configurations of various types. For example, the plurality of fibers can be grouped together to form a twisted or untwisted yarn. The fibers of yarn may be formed as a felt, knitted or woven (plain, basket, satin and crow feet weaves, etc.) into a network, fabricated into a nonwoven fabric (random or ordered orientation), arranged in a parallel array, layered, or formed into a fabric by any of a variety of conventional techniques, including stitching. Similarly, the tapes may be woven into a network, fabricated into a nonwoven fabric, arranged in a parallel array, or formed into a fabric by any of a variety of conventional techniques.

In the preferred embodiments of the invention, the layer comprises untwisted multi-filament yarn bundles which are substantially parallel, unidirectionally aligned, and substantially coated with a matrix material. Two or more of these layers are preferably cross-plied, that is, with each layer rotated with respect to adjacent layers. An example is a five layer article with the second, third, fourth and fifth layers rotated +45°, −45°, 90° and 0° with respect to the first layer. Another, preferred example includes two layers with a 0°/90° layout.

The cross-sections of filaments for use in this invention may vary widely. They may be of circular or of flat or of oblong or of irregular or regular multi-lobal cross-section having one or more regular or irregular lobes projecting from the linear or longitudinal axis of the filament. It is particularly preferred that the filaments be of substantially circular, flat or oblong cross-section, most preferably the former.

The type of fibers used may vary widely and can be metallic, semi-metallic, inorganic and/or organic fibers. Preferred fibers for use in the practice of this invention are those having a tenacity equal to or greater than about 7 g/d, preferably from about 7 to 85 g/d, a tensile modulus equal to or greater than about 150 g/d, preferably from about 150 to 3000 g/d, and an energy-to-break equal to or greater than about 8 Joules/gram (J/g), preferably from about 8 to 125 J/g. More preferred fibers for use in the practice of this invention are those having a tenacity equal to or greater than about 10 g/d, a tensile modulus equal to or greater than about 200 g/d and an energy-to-break equal to or greater than about 20 Joules/gram (J/g). Particularly preferred fibers are those having a tenacity equal to or greater than about 16 g/d, a tensile modulus equal to or greater than about 400 g/d, and an energy-to-break equal to or greater than about 27 J/g. Amongst these particularly preferred embodiments, most preferred are those embodiments in which the tenacity of the fibers is equal to or greater than about 22 g/d, the tensile modulus is equal to or greater than about 900 g/d, and the energy-to-break is equal to or greater than about 27 J/g. In the practice of this invention, fibers of choice have a tenacity equal to or greater than about 28 g/d, the tensile modulus is equal to or greater than about 1200 g/d and the energy-to-break is equal to or greater than about 40 J/g.

Illustrative of useful organic fibers are those composed of polyesters, polyolefins, polyetheramides, fluoropolymers, polyethers, celluloses, phenolics, polyesteramides, polyurethanes, epoxies, aminoplastics, silicones, polysulfones, polyetherketones, polyetheretherketones, polyesterimides, polyphenylene sulfides, polyether acryl ketones, poly(amideimides), and polyimides. Illustrative of other useful organic fibers are those composed of aramids (aromatic polyamides); aliphatic and cycloaliphatic polyamides; and aliphatic, cycloaliphatic and aromatic polyesters; and the like, such as are disclosed in U.S. Pat. No. 4,916,000, hereby incorporated by reference.

Also illustrative of useful organic fibers are those of liquid crystalline polymers, as set forth in U.S. Ser. No. 490 179, filed Mar. 8, 1990, and commonly assigned.

Also illustrative of useful organic filaments are those composed of extended chain polymers formed by polymerization of α,β-unsaturated monomers of the formula:

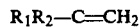

$R_1R_2-C=CH_2$ wherein:

$R_1$ and $R_2$ are the same or different and are hydrogen, hydroxy, halogen, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl. For greater detail see U.S. Pat. No. 4 916 000, previously incorporated by reference.

Illustrative of useful inorganic filaments for use in the present invention are glass fibers such as fibers formed from quartz, magnesia alumuninosilicate, non-alkaline aluminoborosilicate, soda borosilicate, soda silicate, soda lime-aluminosilicate, lead silicate, non-alkaline lead boroalumina, non-alkaline barium boroalumina, non-alkaline zinc boroalumina, non-alkaline iron aluminosilicate, cadmium borate, alumina fibers which include "saffil" fiber in eta, delta, and theta phase form, asbestos, boron, silicone carbide, graphite and carbon such as those derived from the carbonization of polyethylene, polyvinylalcohol, saran, polyamide (Nomex) type, nylon, polybenzimidazole, polyoxadiazole, polyphenylene, PPR, petroleum and coal pitches (isotropic), mesophase pitch, cellulose and polyacrylonitrile, ceramic fibers, metal fibers as for example steel, aluminum metal alloys, and the like.

In the preferred embodiments of the invention, the networks are fabricated from high molecular weight polyethylene fiber, high molecular weight polypropylene fiber, aramid fiber, high molecular weight polyvinyl alcohol fiber, high molecular weight polyacrylonitrile fiber, liquid crystalline polymer fiber or mixtures thereof. For descriptions of these fibers and ways to make them, see U.S. Pat. Nos. 4 457 985, 4 137 394, 4 356 138, and 4 551 296, German Off. 3 004 699 and GB 20512667 (polyethylene); U.S. Pat. Nos. 4 663 101, 4 784 820, and U.S. patent application Ser. No. 069 684, filed July 6, 1987 (see published application WO 89 00213) (polypropylene); U.S. Pat. Nos. 4 440 711 and 4 599 267 (polyvinyl alcohol); U.S. Pat. No. 4 535 027 (polyacrylonitrile); U.S. Pat. No. 3 671 542 (aramid); all of which are hereby incorporated by reference; and U.S. Ser. No. 490 179, filed Mar. 8, 1990.

In the case of liquid crystal copolyesters, suitable fibers are disclosed, for example, in U.S. Pat. Nos. 3 975 487, 4 118 372, and 4 161 470, hereby incorporated by reference. Tenacities of about 15 to 30 g/d, more preferably about 20 to 25 g/d, modulus of about 500 to 1500 g/d, preferably about 1000 to 1200 g/d, and an energy-to-break of at least about 10 J/g are particularly desirable.

If a matrix material is employed, it can comprise one or more thermosetting resins, or one or more thermoplastic resins, or a combination thereof. As used herein "thermoplastic resins" are resins which can be heated and softened, cooled and hardened limitless times without undergoing a basic alteration, and "thermosetting resins" are resins which do not tolerate thermal cycling and which cannot be resoftened and reworked after molding, extruding or casting and which attain new, irreversible properties when once set at a temperature which is critical to each resin.

The tensile modulus of the matrix material in the final product may be low (flexible) or high (rigid), depending upon the end use. The key requirement of the matrix material is that it be flexible enough to process with the cross ply apparatus of the present invention. In this regard, thermosetting resins which have been B-staged but not fully cured would probably process acceptably, as would fully cured thermosetting resins which can be plied together with compatible adhesives. Heat added to the process would permit processing of higher modulus thermoplastic materials which are too rigid to process otherwise; the temperature "seen" by the material and duration of exposure must be such that the material softens for processing without adversely affecting the impregnated fibers, if any. Choice of an appropriate matrix material would be obvious to one of ordinary skill in the art.

With the foregoing in mind, thermosetting resins useful in the practice of this invention may include, by way of illustration, bismaleimides, alkyds, acrylics, amino resins, urethanes, unsaturated polyesters, silicones, epoxies, vinylesters and mixtures thereof. Greater detail on useful thermosetting resins may be found in commonly assigned U.S. Ser. No. 432 259, filed Nov. 6, 1989. Particularly preferred thermosetting resins are the polyesters and vinylesters, with a vinylester being the thermosetting resin of choice.

Thermoplastic resins for use in the practice of this invention may also vary widely. Illustrative of useful thermoplastic resins are polylactones, polyurethanes, polycarbonates, polysulfones, polyether ether ketones, polyamides, polyesters, poly(arylene oxides), poly(arylene sulfides), thermoplastic elastomers, vinyl polymers, polyacrylics, polyacrylates, polyolefins, ionomers, polyepichlorohydrins, polyetherimides, liquid crystal resins, and copolymers and mixtures thereof. Greater detail on useful thermoplastic resins may be found in commonly assigned U.S. Ser. No. 432 259, filed Nov. 6, 1989. Particularly preferred low modulus thermoplastic (elastomeric) resins are described in U.S. Pat. No. 4 820 568, hereby incorporated by reference, in columns 6 and 7, especially those produced commercially by the Shell Chemical Co. which are described in the bulletin "Kraton Thermoplastic Rubber", SC-68-81. Particularly preferred thermoplastic resins are the high density, low density, and linear low density polyethylenes, alone or as blends, as described in U.S. Pat. No. 4 820 458 in column 7.

The matrix resin may be applied in a variety of ways to the fiber, e.g., encapsulation, impregnation, lamination, extrusion coating, solution coating, solvent coating. Effective techniques for forming coated fibrous layers suitable for use in the present invention are detailed in referenced U.S. Pat. No. 4 820 568 (columns 7–9 and FIG. 6) and U.S. Pat. No. 4 916 000 (columns 11–15 and FIG. 14).

In the most preferred embodiment, plies 12 and 18 releasably adhere to carrier webs 13 and 19, respectively. By "releasably adhere" is meant that the plies adhere to the carrier web even when the carrier web is at an angle to the horizontal; however, this bond is sufficiently weak that it can be overcome, for example, by pulling the ply away from the carrier web or applying heat to the ply and/or carrier web. With reference to the drawing figures, especially FIGS. 4A and 4B, it can be seen that ply 18 continues to adhere to carrier web 19 when web 19 is at an angle to the horizontal between idler rolls 20 and 21 and when carried under web 19 in the cross-ply zone. Heat from heater 26 causes the resin of ply 18 to become tacky for pressing into ply 12' (which is also tacky due to the heat from platen 16) with transfer roll 25. As transfer roll 25 presses plies 18 and 12' together, it is moving toward its home position, and web 19 is lifted due to the pull of contra-rotating let off roll 17. This causes the separation of ply 18 and web 19. There are several ways to releasably adhere the ply to the carrier web, e.g., with heat or pressure sensitive adhesives. It is preferred that the matrix resin of the ply, if any, be used for this purpose. Matrix resin, carrier web, fibers, and/or adhesives can be chosen with this end in mind.

It is also desirable for the plies (12' and 18) to exhibit a substantial interply adhesion to aid in their release from the carrier webs. This interply adhesion can be supplied by the matrix resins of the plies which may be naturally tacky or tacky when heated or pressed. The interply adhesion is increased sufficiently through preconsolidation to prevent the plies being pulled apart.

A preferred technique for forming a resin impregnated layer for cross-plying with the apparatus of the present invention is as follows. Yarn bundles of from about 30 to about 2000 individual filaments of less than about 12 denier, and more preferably of about 100 to about 250 individual filaments of less than about 7 denier, are supplied from a creel, and are led through guides into a collimating comb and then a spreader bar just prior to coating. The collimating comb aligns the filaments coplanarly and in a substantially parallel, and unidirectional fashion. The filaments are then sandwiched between release papers, one of which is coated with a wet matrix resin. This system is then passed under a series of pressure rolls to complete the impregnation of the filaments. The top release paper is pulled off and rolled up on a take-up reel while the impregnated network of filaments proceeds through a heated tunnel oven to remove solvent and then be taken up. Alternatively, the wet matrix resin could be applied to the top of the fiber sheet formed by the collimating comb, and the entire mass passed, between release papers, through a set of gapped rolls. In either case, the matrix resin can be chosen so that the ply releasably adheres to the release paper.

The layers of the cross-plied material useful in the present invention typically contain from 5 to 30 fiber ends per inch (2 to 12 ends per cm) and preferably 10 to 20 ends per inch (4 to 8 ends per cm). Each layer is typically from 0.0001 (0.0025) to 0.015 (0.38), preferably 0.0005 (0.0127) to 0.01 (0.25), more preferably 0.0005 (0.0127) to 0.005 (0.127), and most preferably 0.0005 (0.0127) to 0.0025 (0.064) inches (mm) thick. Layers having these dimensions are particularly useful when made of extended chain polyethylene having a yarn denier of about 1300 denier/240 filaments. The areal density is used to indicate the amount of fiber and/or resin per unit area of the layer. It is determined by the number of yarn strands laid per unit width of sheet and the amount of resin applied to the yarn. Typically, if a 1300 denier/240 filament yarn is laid 10 ends per inch, the yarn areal density in the sheet would be about 52.5 grams per square meter.

In the most preferred embodiment of this invention, two such impregnated networks are then continuously cross-plied, preferably by cutting one of the networks into lengths that can be placed successively across the width of the other network in a 0°/90° orientation. This forms a continuous cross-plied material, which can then be wound with a separation layer of material into a roll/bolt.

Film may optionally be used as one or more layers of the continuously cross-plied material, preferably as an outer layer. The film thickness minimally is about 0.1 mil and may be as large as desired so long as the film is still sufficiently flexible to process on the apparatus. The preferred film thickness ranges from about 0.1 to 1.0 mil, with about 0.25 to 0.50 mil being preferred. Films can be used as a layer (or ply) for a variety of reasons, e.g., to vary frictional properties, to increase flame retardance, to increase chemical resistance, to increase resistance to radiation degradation, and/or to prevent diffusion of material into the matrix of another layer. The film may or may not adhere to the other layer depending on the choice of film, resin and filament. Heat and/or pressure may cause the desired adherence, or it may be necessary to use an adhesive which is heat or pressure sensitive between the film and the other layer to cause the desired adherence. Illustrative adhesives include polystyrene-polyisoprene-polystyrene block copolymer thermoplastic elastomers, thermoplastic and thermosetting polyurethanes, thermoplastic and thermosetting polysulfides, and typical hot melt adhesives such as polyvinyl chloride and the like. Blends of adhesives can also be used.

Films which may be used in the present invention include thermoplastic polyolefinic films, thermoplastic elastomeric films, crosslinked thermoplastic films, crosslinked elastomeric films, polyester films, polyamide films, fluorocarbon films, urethane films, polyvinylidene chloride films, polyvinyl chloride films and multilayer films. Homopolymers or copolymers of these films can be used, and the films should be uniaxially or biaxially oriented. The films may include pigments or plasticizers.

Useful thermoplastic polyolefinic films include those of low density polyethylene, high density polyethylene, linear low density polyethylene, polybutylene, and copolymers of ethylene and propylene which are crystalline.

Polyester films which may be used include those of polyethylene terephthalate and polybutylene terephthalate.

The proportion of matrix to filament in the composite article is not critical and may vary widely, depending upon the end use. In general, the matrix material may form from about 10 to about 90% by weight, preferably about 10 to 80%, and most preferably about 10 to 40%, based on the weight of the final composite, or the equivalent volume fraction.

The following examples are presented to provide a more complete understanding of the invention, the specific techniques, conditions, materials, proportions and reported data being set forth to illustrate the principles of the invention and not to limit the scope thereof.

EXAMPLE 1

Layers of unidirectional, high strength, extended chain polyethylene (ECPE) yarn impregnated with a thermoplastic elastomer matrix were cross-plied using the apparatus depicted in the drawing figures.

The yarn was SPECTRA 1000 high strength, extended chain polyethylene produced by Allied-Signal Inc., and having a reported yarn tenacity of approximately 35 g/d, a tensile modulus of approximately 2000 g/d, a yarn denier of approximately 1300 and an individual filament denier of approximately 5.4 (240 filaments, untwisted yarn).

The layers were made by feeding yarn from a creel to form a web of yarn about 29 inches (84 cm) wide and having about 11 yarn ends per inch (2.54 cm). The web of yarn was pulled from creels and coated with a homogeneous solution of about 18% Kraton D-1107 and about 82% by weight of methylene chloride on a sixty pound silicone coated release paper, available commercially from any one of Akrosil, Daubert Coated Products, Inc., and West Carrollton Parchment Company. The impregnated web on the release paper was wound on itself to form the feed stock material for the cross-ply apparatus of the present invention.

Kraton D-1107, which is a styrene-isoprene-styrene block copolymer (SIS) having about 14% by weight styrene, is sold by the Shell Chemical Company and described in the bulletin *Kraton Thermoplastic Rubber,* *Typical Property guide KratonD and Kraton G* It (No. SC:68-81). It is reported to have a glass transition temperature of −55° C., a melt index of 9 g/10 min at ASTM 1238 Condition G, and a modulus tested using ASTM-D461 with a jaw separation speed of 10 in/min of 100 psi at 300% elongation.

With reference to the drawing figures, two twenty-nine inch (84 cm) wide plies 12 on release paper as carrier webs 13 were trimmed to about twenty-seven inches (69 cm) wide and slightly center overlapped [about 0.03 to 0.06 inch (about 0.8 to 1.6 mm)] to an overall width of about fifty-four inches (137 cm) to form ply 12' which was passed across heated platen 16 with ply 12' facing up. A third twenty-nine inch (84 cm) wide ply 18 on release paper (carrier web 19) was cut (in timed sequence) into discrete lengths on the release paper and trimmed to feed, ply 18 side down, at a 90° angle across and above ply 12' on heated platen 16. Platen 16 was heated to a temperature of about 79° C. (175° F.)[acceptable range for this fiber/resin ply about 66° to 93° C. (150° to 200° F)]. A radiant heater heated release paper 19 just prior to transfer roll 25 pressing ply 18 into ply 12' to form cross-plied material 30. The release paper 19 transfer thermal capacity (in watts of radiant heat per linear inch) was about 8 (acceptable range 0 to 40), and the pressure applied by transfer roll 25 was about 50 lbs/linear resin matrices of plies 12' and 18 were softened by the heat of platen 16 and heater 26, respectively, to permit preconsolidation. The cross-plied material 30 (twenty-seven inches long and fifty-four inches wide) was advanced in timed sequence so that additional plies 18 could be sequentially laid in a substantially abutting relationship on ply 12' to be plied into material 30 for continuous take-up on a 60 inch (152 cm) core with a polyethylene film interleaf to form bolt 40. Take-up stand tension was targeted for about 5 lbs/linear inch (acceptable range 3 to 10 lbs/linear inch); idle tension was set slightly lower. It is critical to anti-ballistic end use that there be no gap between plies 18 on ply 12', and for that reason, plies 18 are permitted to slightly overlap, e.g., about 0.25 to 0.38 inch (6 to 9.4 mm). This slight degree of overlap does not adversely affect performance of the cross-plied material 30. Bolt 40 is supplied to a customer who can then cut material 30 for incorporation into lightweight body armor or rigid composite armor.

The true scope of the invention is to be determined from the following claims.

We claim:

1. Apparatus for the automated cross-plying of a first, continuous ply of material and plurality of second, discontinuous plies of material into a cross-plied continuous length of material, each of said first and said second plies of material having a longitudinal axis, comprising:
   a) means for advancing said first ply of material into a cross-plying zone;
   b) means for sequentially laying said second plies of material coplanarly on said first ply in the cross-plying zone with the longitudinal axis of each of said second plies rotated relative to the longitudinal axis of said first ply, said means for laying comprising a second carrier web on which said discontinuous plies are separately carried; second pull means to pull the second carrier web with said discontinuous plies thereon so that each discontinuous ply and said first ply face each other, without contact, in the cross-plying zone; and means for guiding each discontinuous ply and said first ply into contact with one another;

c) means for preconsolidating said first and said second plies in the cross-plying zone; and d) means for withdrawing the cross-plied material from the cross-plying zone.

2. The apparatus of claim 1 wherein said means for laying said second plies lays each second ply substantially abutting the next adjacent second ply on said first ply.

3. The apparatus of claim 2 wherein each of said second plies has a length substantially equal to the width of said first ply and wherein said means for laying said second plies lays each of said second plies with its non-abutting outer edges substantially in register with the continuous edges of said first ply.

4. The apparatus of claim 3 wherein the means for advancing the first ply of material into the cross-plying zone comprises, in combination: a first carrier web on which said first ply is carried; first supply means for supplying the first ply of material on said first carrier web; and first pull means to pull the first carrier web from said first supply means under tension into the cross-plying zone.

5. The apparatus of claim 4 wherein said first supply means comprises a roll on which said first ply of material and said first carrier web have been wound together.

6. The apparatus of claim 5 wherein said first pull means comprises a pair of driven pinch rolls downstream of the cross-plying zone.

7. The apparatus of claim 5 wherein said first supply means comprises a driven feed roll on which said first ply of material and said first carrier web have been wound together, and wherein said first pull means comprises a driven roll downstream of the cross-plying zone.

8. The apparatus of claim 3 wherein said means for withdrawing the cross-plied material from the cross-plying zone is a take-up roll.

9. The apparatus of claim 1 wherein said means for sequentially laying the second plies is responsive to the advance into the cross-plying zone of a predetermined length of the first ply of material, and wherein said means for withdrawing and said means for advancing are each responsive to the laying and preconsolidation of a second ply on the first ply.

10. The apparatus of claim 1 wherein said second pull means is a pair of driven pinch rolls.

11. The apparatus of claim 1 wherein said means for guiding each discontinuous ply and said first ply into contact with one another comprises a press roll.

12. The apparatus of claim 1 further comprising means for releasing the cross-plied material from said second carrier web, wherein said discontinuous plies releasably adhere to said second carrier web.

13. The apparatus of claim 1 further comprising a cutting means for cutting said first ply in a direction transverse to its longitudinal axis a sufficient number of times to form a plurality of discontinuous pieces of said first ply, and wherein said means for sequentially laying said discontinuous pieces of the second ply on said first ply sequentially lays one of said pieces in register with one of the discontinuous pieces of the first ply.

14. The apparatus of claim 1 wherein said means for preconsolidating said first and said second plies comprises a means for applying heat and pressure to said first and said second plies in the cross-plying zone.

15. The apparatus of claim 14 wherein said means for applying heat and pressure comprises a heated platen positioned to heat said first ply, a press roll opposing said platen so that said first and second plies pass between said press roll and said platen, and a heater positioned to heat said second ply.

16. The apparatus of claim 15 wherein said heated platen is formed with perforations.

17. Apparatus for the automated production of a cross-plied material from a first, continuous ply of material and a second, continuous ply of material, said first and said second plies of material each comprising a network of fibers substantially coated with a resin matrix, said first and said second plies exhibiting substantial interply adherence when brought into contact with one another, each of said first and said second plies of material having a longitudinal axis, comprising:

a) means for advancing said first ply of material into a cross-plying zone;

cutting means for cutting said second ply in a direction transverse to its longitudinal axis a sufficient number of times to form a plurality of discontinuous pieces of said second ply;

c) means for sequentially laying said discontinuous pieces of the second ply coplanarly on said first ply in the cross-plying zone with the longitudinal axis of each of said pieces rotated relative to the longitudinal axis of said first ply, said means for laying comprising a second carrier web on which said discontinuous pieces are separately carried; second pull means to pull the second carrier web with said discontinuous pieces thereon so that each discontinuous piece and said first ply face each other, without contact, in the cross-plying zone; and means for guiding each discontinuous piece and said first ply into contact with one another;

d) means for preconsolidating said discontinuous pieces and said first ply in the cross-plying zone; and e) means for withdrawing the cross-plied material from the cross-plying zone.

18. The apparatus of claim 17 wherein the means for advancing the first ply of material into the cross-plying zone comprises, in combination: a first carrier web on which said first ply is carried; first supply means for supplying the first ply of material on said first carrier web; and first pull means to pull the first carrier web from said first supply means under tension into the cross-plying zone.

19. The apparatus of claim 18 wherein said first supply means comprises a roll on which said first ply of material and said first carrier web have been wound together.

20. The apparatus of claim 19 wherein said first pull means comprises a pair of driven pinch rolls downstream of the cross-plying zone.

21. The apparatus of claim 18 wherein said first supply means comprises a driven feed roll on which said first ply of material and said first carrier web have been wound together, and wherein said first pull means comprises a driven roll downstream of the cross-plying zone.

22. The apparatus of claim 15 wherein said means for withdrawing the cross-plied material from the cross-plying zone is a take-up roll.

23. The apparatus of claim 17 wherein said means for sequentially laying the discontinuous pieces is responsive to the advance into the cross-plying zone of a predetermined length of the first play of material.

24. The apparatus of claim 17 wherein said second pull means is a pair of driven pinch rolls.

25. The apparatus of claim 17 wherein said means for guiding each discontinuous piece and said first ply into contact with one another comprises a press roll.

26. The apparatus of claim 17 further comprising means for releasing the cross-plied material from said second carrier web, wherein said discontinuous plies releasably adhere to said second carrier web.

27. The apparatus of claim 17 further comprising second cutting means for cutting said first ply in a direction transverse to its longitudinal axis a sufficient number of times to form a plurality of discontinuous pieces of said first ply, and wherein said means for sequentially laying said discontinuous pieces of the second ply on said first ply sequentially lays one of said pieces in register with one of the discontinuous pieces of the first ply.

28. The apparatus of claim 17 wherein said means for laying said continuous pieces of the second ply lays each piece substantially abutting the next adjacent piece on said first ply.

29. The apparatus of claim 28 wherein each of said discontinuous pieces has a length substantially equal to the width of said first ply and wherein said means for laying said discontinuous pieces of the second ply lays each of said second plies with its non-abutting outer edges substantially in register with the continuous edges of said first ply.

30. The apparatus of claim 17 wherein said means for preconsolidating said first and said second plies comprises means for applying heat and pressure to said first and second plies in the cross-plying zone.

31. The apparatus of claim 30 wherein said means for applying heat and pressure comprises a heated platen positioned to heat said first ply, a press roll opposing said platen so that said first and second plies pass between said press roll and said platen, and a heater positioned to heat said second ply.

32. The apparatus of claim 31 wherein said heated platen is formed with perforations.

33. Apparatus for the automated production of a cross-plied material from a first continuous ply of material and a second, continuous ply of material, each of said plies of material comprising a network of unidirectional fibers substantially coated with a resin matrix, each of said first and said second plies of material having a longitudinal axis substantially in the direction of said unidirectional fibers, said first and said second plies exhibiting substantial interply adherence when brought into contact with one another, comprising:
 a) a first carrier web, to carry said first ply;
 b) first supply means, for supplying said first ply of material on said first carrier web to a cross-plying zone;
 c) first pull means to pull the first carrier web from said first supply means through said cross-plying zone;
 d) a second carrier web, to carry said second ply, said second ply releasably adhering to said second carrier web;
 e) second supply means, for supplying said second ply of material on said second carrier web to the cross-plying zone;
 f) a cutter, for cutting the second ply while on said second carrier web in a direction transverse to the longitudinal axis to form a discontinuous piece of said second ply, said piece being cut to a length substantially equal to the width of said first ply;
 g) second pull means to pull the second carrier web with said discontinuous piece thereon so that the length of said discontinuous piece and the width of said first ply face each other and are in substantial register with one another in the cross-plying zone, said second pull means pulling the second carrier web from the cross-plying zone after said discontinuous piece and said first ply in the cross-plying zone are cross-plied;
 h) means for guiding said discontinuous piece and said first ply into contact with one another;
 i) means for preconsolidating said discontinuous piece and said first ply;
 j) means for releasing said cross-plied material from said second carrier web; and
 k) means for withdrawing the cross-plied continuous length of material from the cross-plying zone.

34. The apparatus of claim 33 wherein said means for preconsolidating said first and said second plies comprises a means for applying heat and pressure to said first and said second plies in the cross-plying zone.

35. The apparatus of claim 34 wherein said means for applying heat and pressure comprises a heated platen positioned to contact said first carrier web, a press roll positioned to contact said second carrier web, said heated platen and said press roll arranged so that said first and said second plies pass between said press poll and said platen, and a heater positioned to heat said second ply.

36. The apparatus of claim 35 wherein said heated platen is formed with perforations.

37. Method for the automated production of a cross-plied continuous length of material from a first, continuous ply of material and a plurality of second, discontinuous plies of material, each of said first and said second plies of material having a longitudinal axis, comprising the steps of:
 a) advancing said first ply of material into a cross-plying zone;
 b) advancing said second, discontinuous plies of material so that each discontinuous ply and said first ply face each other, without contact, in said cross-plying zone;
 c) sequentially laying said second plies of material coplanarly on said first ply in the cross-plying zone with the longitudinal axis of each of said second plies rotated relative to the longitudinal axis of said first ply;
 preconsolidating said first and said second plies in the cross-plying zone; and
 withdrawing the cross-plied material from the cross-plying zone.

38. The method of claim 37 wherein each of said second ply substantially abuts the next adjacent second ply on said first ply.

39. The method of claim 38 wherein each of said second plies has a length substantially equal to the width of said first ply and wherein step b) comprises advancing said second plies so that each of said second plies is positioned with its non-abutting outer edges substantially in register with the continuous edges of said first ply.

40. The method of claim 38 further comprising the step of rolling up the cross-plied material withdrawn from the cross-plying zone.

41. The method of claim 37 wherein said first and said second plies exhibit substantial interply adherence when brought into contact with one another.

42. The method of claim 41 wherein each of said first and said second plies comprises a network of fibers substantially coated with a resin matrix.

43. The method of claim 42 wherein said fibers are unidirectional in orientation.

44. The method of claim 37 wherein steps c) and d) comprise advancing said first and second plies between a press roll and a heated platen.

45. The method of claim 44 wherein a vacuum is applied to the side of said second ply not in contact with said first ply.

* * * * *